United States Patent

[11] 3,607,295

[72] Inventor Dee R. Morgan
1994 North 800 East, Logan, Utah 84321
[21] Appl. No. 768,929
[22] Filed Oct. 18, 1968
[45] Patented Sept. 21, 1971

[54] PLASTIC MOLDABLE COMPOSITION USEFUL AS A FISH BAIT
7 Claims, No Drawings

[52] U.S. Cl. ................................................. 99/3, 99/9, 99/20, 99/118
[51] Int. Cl. ................................................. A01k 85/00
[50] Field of Search ........................................... 99/1, 2, 7, 3, 20, 222, 14, 18, 19, 115, 162, 178; 43/41–42; 252/186–187

[56] References Cited
UNITED STATES PATENTS

| | | | |
|---|---|---|---|
| 2,555,088 | 5/1951 | Irwin | 43/41 |
| 2,874,048 | 2/1959 | Walldov | 99/3 |
| 2,904,436 | 9/1959 | Auerbach | 99/3 |
| 3,260,674 | 7/1966 | Ross | 252/186 |
| 3,322,544 | 5/1967 | Yakstis | 99/3 |
| 3,361,566 | 1/1968 | Axelrod | 99/3 |
| 3,410,689 | 11/1968 | Nathan | 99/3 X |
| 3,428,459 | 2/1969 | Hinds | 99/3 |

OTHER REFERENCES

U.S. Dept. of Interior Fishery Leaflet 28 (1946) pp. 16–19
Hachk's Chemical Dictionary " casein" page 173

Primary Examiner—Norman Yudkoff
Assistant Examiner—F. E. Drummond
Attorneys—Mallinckrodt & Mallinckrodt, P. H. Mallinckrodt and Philip A. Mallinckrodt ABSTRACT: A composition for use as a fish bait is produced by blending fat characterized by an overall melting point above about 90° F. and a solid fat index above about 25 at 70° F. with appropriate quantities of water, casein (or caseinates), filler, and emulsifying agents to produce a moldable, semisolid, plastic material which retains its adhesive properties even after prolonged use in contact with water.

PLASTIC MOLDABLE COMPOSITION USEFUL AS A FISH BAIT

BACKGROUND OF THE INVENTION

1. Field

This invention relates to compositions of matter constituting artificial fish baits.

2. State of the Art

Processed cheese and compositions containing cheese have become popular as fish baits. These are used in generally the same manner as are natural or live baits, but have the advantage of being capable of prolonged storage so they are available for use without the necessity of obtaining a fresh supply before each fishing trip. A difficulty common to such baits in greater or less degree is that they decrepitate, i.e. loose their adhesive characteristics, when placed in water or kept there for any length of time. Moreover, cheese is a relatively high-cost ingredient.

SUMMARY OF THE INVENTION

The composition of the present invention, although similar in consistency and appearance to fish baits made from cheese, has superior physical properties and is manufactured from much less expensive ingredients. It has more plasticity and elasticity than comparable cheese products and retains its cohesiveness even after prolonged contact with water.

In producing the composition of the invention, fats or oils of prescribed physical properties are blended with any one or more of a variety of forms of chemical casein or caseinate, one or more fillers such as skim milk or whey solids, water, and emulsifier, to produce a moldable, semisolid, plastic material. Other ingredients, such as stabilizing gums, preservatives, coloring, and artificial flavoring, may be included but are not essential. The manufacturing process involves merely mixing the materials together and heating them to a temperature which produces a viscous, but pourable, homogenous liquid. This liquid may be poured directly into packages appropriate for retail sales and allowed to cool and solidify therein.

The proportioning of ingredients in the composition is highly variable, the preferred proportions depending largely upon the characteristics of the fat being employed. Suitable fats have a solid fat index of at least about 25 at 70° F. and an overall melting point of at least about 90° F. The higher the index and the higher the overall melting point, the greater the proportion of fat which may be included in the product. Although an optimum fat content for the product is presently considered to be about 15 percent by weight, satisfactory products may include as little as about 5 to as much as about 25 percent by weight, based on the total weight of the composition, about 10 to about 20 percent by weight constituting the normal range. The term "fat" is used in its broadest sense herein and in the claims to include either a solid or a modified liquid fat having the prescribed melting point and solid fat index. Thus, liquid fats such as oils and fluid waxes may be modified in various ways, conventional in the industry, to meet the specifications for the claimed composition. Natural fats such as beef or sheep tallow are excellent and are generally available at low cost. Various fats of the type known in the art as "coating fats" are also suitable. Fats and oils which do not meet the specifications of fats for use by this invention may be hydrogenated, fractionated, or otherwise modified to synthetically produce satisfactory physical properties for use. For example, coconut oil may be hydrogenated to produce a satisfactory product having a solid fat index of about 30 at 70° F. and an overall melting point of about 93° F.

The amount of chemical casein to be included in he composition is more closely related to the properties of rather than to the quantity of fat included in a particular composition. Thus, fat is usually included to the maximum permissible extent, and chemical casein is included in quantity necessary to provide the desired plastic and elastic properties for the composition. Without regard to the specific amount of fat included in the composition, casein is normally present in amounts ranging from about 10 to about 30 percent, preferably less than about 20 percent, by weight, with about 15 percent by weight usually being considered optimum. The term "chemical casein" is used herein and in the claims to denote neutral casein, a metal caseinate, notably sodium caseinate, and a casein salt derived from milk.

It is desirable to include as much water as possible in the composition, about 40 to about 60 percent by weight being the normal range. Accordingly, emulsifiers and fillers are included in the composition to provide the requisite stiffness and firmness. Usually, in an optimum product, the filler will be present in about the same range as the chemical casein, but satisfactory compositions include from about 5 to about 25, preferably between about 10 and about 20 percent, by weight of the filler. Suitable fillers include cheese whey solids, corn syrup solids, sugars, vegetable or cereal flours such as wheat starches, vegetable gums, and skim mild solids. When skim mild solids are employed, somewhat less chemical casein need be added separately because of the casein constituent of such skim milk solids. It is not possible to introduce all of the casein requirement in this fashion, however. Sufficient filler is included to render the composition stiff, while sufficient emulsifying salt is included to render the composition firm.

Any of the conventional phosphate, polyphosphate, pyrophosphate, phosphonite, tartrate, or citrate emulsifiers known to the art may be employed. Examples of suitable emulsifying agents are monosodium phosphate, disodium phosphate, dipotassium phosphate, trisodium phosphate, sodium metaphosphate, sodium acid pyrophosphate, tetrasodium pyrophosphate, sodium citrate, potassium citrate, sodium tartrate, sodium tripolyphosphate, tartrate, sodium trimetaphosphate, tetresodium pyrophosphate, sodium tripolyphosphate, and phosphonates such as $N(CH_2PO_3H_2)_3$ and $N(CH_2PO_3Na_2)_3$. The emulsifier is typically present in the composition in amounts ranging from about 1 to about 3 percent by weight. Greater amounts, while tolerable, are ordinarily of no significant benefit.

The pH of the composition of this invention is a significant factor and is influenced by the pH of the emulsifier used. Although the preferred pH varies somewhat, depending upon the specific ingredients of the composition, it should in nearly all cases be between about 5 and about 7. Ordinarily, compositions with pH below about 5.2 tend to crumble while those with pH above about 6.2 tend to be unduly sticky. The pH range of about 5.5 to about 5.9 is preferred, with pH about 5.7 being considered optimum in most instances. When an emulsifier of low pH, such as sodium acid pyrophosphate is used, it should be mixed with sufficient phosphate of higher pH, e.g. tetrasodium pyrophosphate, or other basic material, e.g. an alkali metal hydroxide, notably sodium hydroxide, to avoid reducing the pH of the fish bait composition to the point that it becomes crumbly. Similarly, when a strongly basic emulsifier is used, its pH effect should be appropriately balanced, e.g. by adding phosphoric or other compatible acid to the composition, to avoid undue stickiness.

DESCRIPTION OF A SPECIFIC EMBODIMENT

To 14 parts of rendered beef fat was added eight parts of sodium caseinate, 20 parts of skim mild powder, one-half part Locust bean gum, 1.4 parts sodium acid pyrophosphate, 0.6 parts tetrasodium pyrophosphate, 0.2 parts potassium sorbate, and 55 parts water, all parts by weight. The mixture was heated to 180° F. in a steam-jacketed cooker, and sufficient cheese coloring was added to impart a natural cheddar cheese color to the composition. At cooking temperature, the product was a viscous but pourable liquid. The mixture was poured into widemouth glass jars and allowed to cool. Upon cooling to room temperature, the product was a semisolid plastic composition with good molding properties and had a pH of 5.77.

I claim:

1. A semisolid, plastic composition useful as a fish bait and having the properties of plasticity, elasticity, and moldability upon heating and solidifying, and comprising a substantially homogeneous mixture of fat having a solid fat index above about 25 at 70° F. and an overall melting point of about 90° F.; sufficient metal caseinate to impart plasticity and elasticity; and water, filler, and an emulsifying agent in relative proportions, imparting a firm and tough consistency to the composition; said composition comprising by weight about 5–25 percent fat; about 10–30 percent metal caseinate, about 5–25 percent filler and about 40–60 percent water.

2. A composition according to claim 1 limited to about 10 to about 20 percent by weight fat; less than about 20 percent by weight of the caseinate and about 10 to about 20 percent filler.

3. A composition according to claim 2 wherein the filler comprises solids selected from the group consisting of milk solids and whey solids.

4. A composition according to claim 3, having a pH of about 5 to about 7.

5. A composition according to claim 4, having a pH of about 5.5 to about 5.9.

6. A composition according to claim 5, wherein the fat is select the group consisting of beef tallow and sheep tallow.

7. A composition according to claim 6, wherein the filler comprises milk solids.